(12) United States Patent
Jeong et al.

(10) Patent No.: US 9,557,980 B2
(45) Date of Patent: Jan. 31, 2017

(54) SEAMLESS APPLICATION INTEGRATION APPARATUS AND METHOD

(75) Inventors: Bok-Deuk Jeong, Yongin-si (KR); Chan-Ju Park, Suwon-si (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 13/155,120

(22) Filed: Jun. 7, 2011

(65) Prior Publication Data

US 2012/0159482 A1 Jun. 21, 2012

(30) Foreign Application Priority Data

Dec. 17, 2010 (KR) ........................ 10-2010-0130255

(51) Int. Cl.
*G06F 9/44* (2006.01)
*G06F 9/445* (2006.01)

(52) U.S. Cl.
CPC ........................................ *G06F 8/61* (2013.01)

(58) Field of Classification Search
CPC .................................. G06F 9/455; G06F 8/61
USPC .............................................. 717/168; 718/1
See application file for complete search history.

(56) References Cited

U.S. PATENT DOCUMENTS

| | | | | |
|---|---|---|---|---|
| 7,131,122 B1* | 10/2006 | Lakhdhir | ................. | G06F 8/65 717/168 |
| 7,681,134 B1* | 3/2010 | Grechishkin | ........ | G06F 9/4443 709/205 |
| 7,788,593 B1* | 8/2010 | Grechishkin | ........ | G06F 9/4443 717/174 |
| 7,844,721 B2* | 11/2010 | Lee et al. | ..................... | 717/168 |
| 7,890,951 B2* | 2/2011 | Vinberg | ................... | G06F 8/65 717/173 |
| 7,904,694 B2* | 3/2011 | Brandt et al. | ................. | 711/206 |
| 7,987,432 B1* | 7/2011 | Grechishkin et al. | ........ | 715/778 |

(Continued)

FOREIGN PATENT DOCUMENTS

| | | |
|---|---|---|
| CN | 101216777 A | 7/2008 |
| CN | 101478837 A | 7/2009 |

(Continued)

OTHER PUBLICATIONS

Mann et al. "CrossRoads: Seamless VM Mobility Across Data Centers through Software Defined Networking", 2012, IEEE.*

(Continued)

*Primary Examiner* — Anna Deng
*Assistant Examiner* — Junchun Wu
(74) *Attorney, Agent, or Firm* — NSIP Law

(57) ABSTRACT

A seamless application integration apparatus and method are provided. The seamless application integration apparatus includes a seamless integration server that is installed in a host virtual machine so as to provide a seamless application integration (SAI) environment in a virtualization system that comprises the host virtual machine and at least one guest virtual machine. The apparatus also includes a dynamic reconfiguration unit determines whether a seamless integration client that corresponds to the seamless integration server has been installed in the guest virtual machine, and that may install the seamless integration client in the guest virtual machine according to the determination result.

15 Claims, 12 Drawing Sheets

(56) References Cited

U.S. PATENT DOCUMENTS

| | | | |
|---|---|---|---|
| 8,146,074 B2* | 3/2012 | Ito | G06F 8/65 |
| | | | 717/170 |
| 8,225,317 B1* | 7/2012 | Chiueh | G06F 9/455 |
| | | | 718/1 |
| 2006/0010433 A1 | 1/2006 | Neil | |
| 2007/0011672 A1* | 1/2007 | Bhide | G06F 8/61 |
| | | | 717/174 |
| 2007/0220511 A1* | 9/2007 | Clarke et al. | 717/174 |
| 2007/0244905 A1 | 10/2007 | Ito et al. | |
| 2008/0140897 A1* | 6/2008 | Ganguly | 710/268 |
| 2009/0077552 A1 | 3/2009 | Sekiguchi et al. | |
| 2009/0327905 A1* | 12/2009 | Mascarenhas | H04L 67/36 |
| | | | 715/738 |
| 2009/0328033 A1 | 12/2009 | Kohavi et al. | |
| 2010/0037243 A1 | 2/2010 | Mo et al. | |
| 2010/0070972 A1* | 3/2010 | Kumagai | G06F 9/45504 |
| | | | 718/1 |
| 2010/0251236 A1 | 9/2010 | Sheehan et al. | |
| 2011/0047541 A1* | 2/2011 | Yamaguchi | G06F 9/45558 |
| | | | 718/1 |
| 2011/0126197 A1* | 5/2011 | Larsen | H04L 9/3213 |
| | | | 718/1 |
| 2011/0225578 A1* | 9/2011 | Lauwers et al. | 717/176 |
| 2013/0007743 A1* | 1/2013 | Sekiguchi et al. | 718/1 |
| 2013/0014111 A1* | 1/2013 | Ciano et al. | 718/1 |
| 2013/0312055 A1* | 11/2013 | Yamaguchi et al. | 726/1 |
| 2015/0212848 A1 | 7/2015 | Yamaguchi et al. | |

FOREIGN PATENT DOCUMENTS

| | | |
|---|---|---|
| JP | 9-128277 | 5/1997 |
| KR | 10-2008-0092432 | 10/2008 |
| KR | 10-2010-0018387 | 2/2010 |
| WO | WO 2010/100769 A1 | 9/2010 |

OTHER PUBLICATIONS

Scott, "Frameworks for Component-Based Client/Server Computing", Mar. 1998, ACM, vol. 30 No. 1.*

Figueiredo et al. "A Case for Grid Computing on Virtual Machines", 2003, ACM.*

Wallen, J. "Install Guest Additions for a Better VirtualBox Experience" Jul. 17, 2009. Retrieved from the Internet: http://www.ghacks.net/2009/06/17/install-guest-additions-for-a-better-virtualbox-experience/ (retrieved on Mar. 30, 2012) 9 pages.

European Search Report dated Apr. 20, 2012, issued in counterpart European Patent Application No. 11193902.1; 7 pages.

Wallen J. "Install Guest Addition for a better VirtualBox experience", http://www/ghacks.net/2009/06/17/install-guest-additions-for-a-better-virtualbox-experience/, Jun. 17, 2009, 8 pages.

Office Action issued by the Chinese Patent Office on Dec. 4, 2015, in counterpart to U.S. Appl. No. 13/155,120, 12 pages.

Chinese Office Action issued Nov. 23, 2016, in counterpart Chinese Application No. 201110159698.8 (4 pages in English, 4 pages in Chinese).

* cited by examiner

SEAMLESS APPLICATION INTEGRATION APPARATUS AND METHOD

CROSS-REFERENCE TO RELATED APPLICATION(S)

This application claims the benefit under 35 U.S.C. §119(a) of Korean Patent Application No. 10-2010-0130255, filed on Dec. 17, 2010, in the Korean Intellectual Property Office, the entire disclosure of which is incorporated herein by reference for all purposes.

BACKGROUND

1. Field

The following description relates to the seamless integration of applications in a system that utilizes virtualization technologies.

2. Description of the Related Art

A system virtualization technology enables various operating systems to be run on a single physical device using a single hardware of the physical device that acts as numerous pieces of virtualized hardware. Through the use of virtualization various types of operating systems may run independently from one another in a virtual environment provided according to the system virtualization technology. Accordingly, a user is able to seamlessly run an application without the need to recognize an operating system on which the application is running.

A virtualized system includes a plurality of domains that each correspond to a respective operating system. In this example, domains may be classified into main domains that are capable of accessing system hardware and sub-domains that are incapable of accessing the system hardware. While in use a user may experience the appearance that a sub-domain is running as a main domain, according to a system virtualization technology.

As such, to provide a seamless application integration environment, each domain of a system may have a seamless application integration module installed therein. However, if an operating system of a sub-domain migrates from another system, the sub-domain may not have a seamless application integration module installed therein. In addition, if the seamless application integration modules in the respective domains are not matched with one another, or if a runtime environment of each domain changes, it may be difficult to offer an appropriate seamless application integration environment to a user.

SUMMARY

In one general aspect, there is provided a seamless application integration apparatus including a seamless integration server configured to be installed in a host virtual machine to provide a seamless application integration (SAI) environment in a virtualization system that is comprises the host virtual machine and at least one guest virtual machine, and a dynamic reconfiguration unit configured to determine whether a seamless integration client that corresponds to the seamless integration server has been installed in the guest virtual machine, and to install the seamless integration client in the guest virtual machine based on the determination result.

The dynamic reconfiguration unit may be further configured to examine a process list or a file system of the guest virtual machine to detect whether the seamless integration client has been installed.

The dynamic reconfiguration unit may be further configured to access a file system of the guest virtual machine to store an installation file of the seamless integration client, access a memory area of the guest virtual machine to insert a bootstrap code to run the seamless integration client, and change a location of a program counter of the guest virtual machine to a location at which the bootstrap code is inserted.

The dynamic reconfiguration unit may be further configured to determine whether the memory area of the guest virtual machine is modified as a result of execution of the installed seamless integration client, if the memory area of the guest virtual machine is modified, perform a flush on a translation lookaside buffer for the modified memory area, and if the memory area of the guest virtual machine is not modified, flush a CPU cache and restore VCPU context to return the program counter to an original location.

The dynamic reconfiguration unit may be further configured to be located in a remote system which is physically separated from the virtualization system and to perform installation of the seamless integration client.

In another aspect, there is provided a seamless application integration apparatus including a seamless integration server configured to be installed in a host virtual machine to is provide a seamless application integration (SAI) environment in a virtualization system that comprises the host virtual machine and at least one guest virtual machine, a seamless integration client that corresponds to the seamless integration server and configured to be installed in the guest virtual machine, and a dynamic reconfiguration unit configured to determine whether a version of the seamless integration server matches a version of the seamless integration client, and to replace the seamless integration client based on the determination result.

The dynamic reconfiguration unit may comprise a dynamic reconfiguration server configured to transmit a version check message, and a dynamic reconfiguration client configured to receive the version check message, determine whether the version of the seamless integration client matches the version of the seamless integration server based on the received version check message, replace the seamless integration client based on the determination result to match the versions between the seamless integration server and the seamless integration client, and generate a response to the version check message.

In another aspect, there is provided a seamless application integration apparatus including a seamless integration server configured to be installed in a host virtual machine to provide a seamless application integration (SAI) environment in a virtualization system that comprises the host virtual machine and at least one guest virtual machine, a seamless integration client that corresponds to the seamless integration server and configured to be installed in the guest virtual machine, a dynamic reconfiguration server configured to determine whether each component of the seamless integration server supports a runtime environment of the guest virtual machine and replace or add a component in the seamless integration server based on the determination result, and a dynamic reconfiguration client configured to determine whether each component of the seamless integration client supports a runtime environment of the host virtual machine and replace or add a component in the seamless integration client based on the determination result.

In another aspect, there is provided a seamless application integration method including determining whether a seamless integration client is installed in a guest virtual machine, wherein the seamless integration client corresponds to a seamless integration server which is installed in a host virtual machine that provides a seamless application integration (SAI) environment in a virtualization system that comprises the host virtual machine and at least one guest virtual machine, and installing the seamless integration client in the guest virtual machine based on the determination result.

The seamless application integration method may further comprise determining whether a version of the seamless integration server matches a version of the seamless integration client, and replacing the seamless integration client based on the determination result.

The seamless application integration method may further comprise determining whether the seamless integration server supports a runtime environment of the guest virtual machine or whether the seamless integration client supports a runtime environment of the host virtual machine, and replacing or adding the seamless integration server or the seamless integration client based on the determination result.

In another aspect, there is provided a seamless application integration (SAI) method of a control virtual machine (VM) that includes an SAI server that is executed on a device, the SAI method including in response to a guest VM being ready to execute on the device, determining whether the a SAI client corresponding to the SAI server is installed in the guest VM, in response to determining that the SAI client corresponding to the SAI server is not installed in the guest VM, installing the SAI client in the guest VM, and executing the guest VM.

In response to the SAI client corresponding to the SAI server being installed in the guest VM, the method may further comprise determining whether the version of the SAI client corresponds to the current version of the SAI server.

In response to the current version of the SAI client not being installed in the guest VM, the method may further comprise updating the SAI client with the current SAI client corresponding to the current SAI server.

In response to the SAI client corresponding to the SAI server being installed in the guest VM, the method may further comprise determining whether the SAI server of the control VM and the SAI client of the guest VM match such that each supports a runtime environment of the other.

In response to the SAI client not supporting the runtime environment of the current SAI server, the method may further comprise replacing the SAI client of the guest VM with a SAI client that supports the runtime environment of the current SAI server.

Other features and aspects may be apparent from the following detailed description, the drawings, and the claims.

Figure 1A:
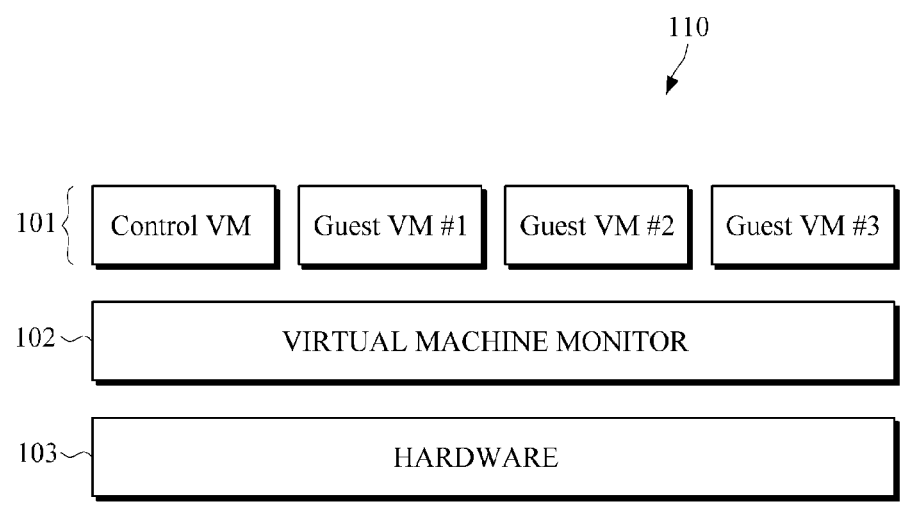
FIGS. 1A and 1B are diagrams illustrating examples of a virtualization system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1B:
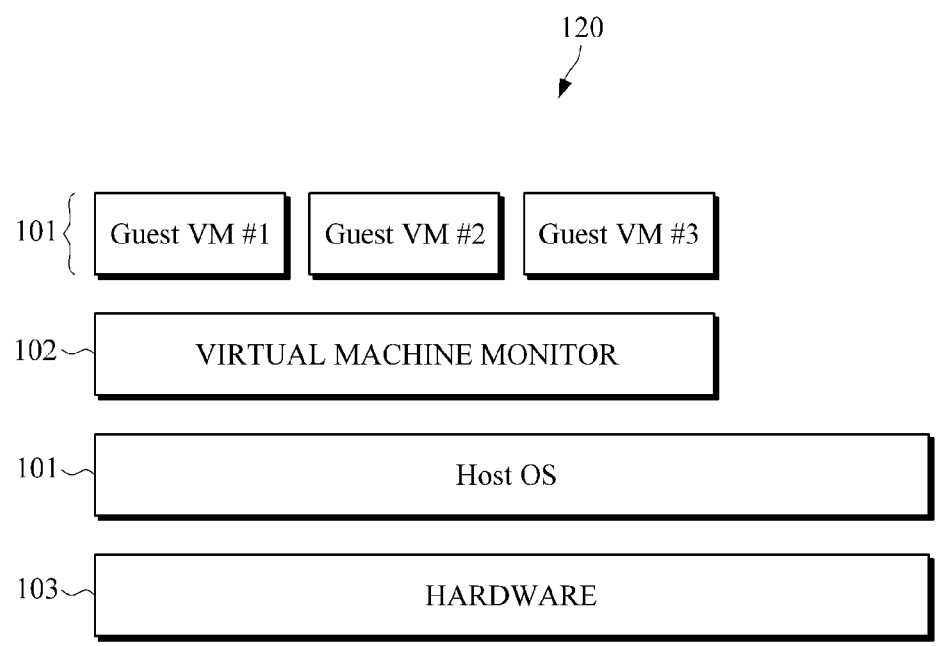

FIGS. 1A and 1B illustrate examples of a virtualization system. In various examples, the virtualization system shown in the example illustrated in FIG. 1A is referred to as a type 1 virtualization system, and the virtualization system shown in the example illustrated in FIG. 1B is referred to as a type 2 virtualization system. Each virtualization system may be or may be included in a terminal, such as a mobile terminal, a computer, a smart phone, a MP3 player, and the like.

Referring to the example illustrated in FIG. 1A, the type 1 virtualization system 110 includes a plurality of virtual machines 101, a virtual machine monitor 102, and hardware 103.

The virtual machines 101 may be different operating systems. For example, one virtual is machine may be a WINDOWS® operating system (OS), another virtual machine may be a LINUX® operating system, and the like. Different types of operating systems may run on the same hardware 103 through the virtual machine monitor 102.

The virtual machine monitor 102 may provide a runtime environment that allows different types of virtual machines 101 to run on the same hardware 103. For example, the virtual machine monitor 102 may provide a communication channel between the virtual machines 101. Examples of the virtual machine monitor 102 may include XEN®, Hypervisor, L4®, and the like.

The virtual machines 101 may be classified into control virtual machines (hereinafter, referred to as "control VMs") and guest virtual machines (hereinafter, referred to as "guest VMs"). The control VM may perform operations to control a guest VM. The control operations may include, for example, generation, start, termination, and deletion of the guest VM. Typically, the control VM is generated first by the virtual machine monitor 102.

The classification of the control VMs and the guest VMs may be initially determined. In various aspects, a control VM may be switched to a guest VM, or vice versa.

Referring to the example illustrated in FIG. 1B, the type 2 virtualization system 120 includes a plurality of virtual machines 101, a virtual machine monitor 102, and hardware 103. In the type 1 virtualization system 110 and the type 2 virtualization system 120 the components are arranged differently. In the type 1 virtualization system 110, a virtual machine monitor layer 102 is positioned above a hardware layer 103, and a virtual machine layer 101 is formed above the virtual machine monitor layer 102. Conversely, in the type 2 virtualization system 120, a host OS layer 101 is formed above a hardware layer 103, and a virtual machine monitor layer 102 is formed above the host OS layer 101.

The virtual machine monitor 102 has the same functionality in both the type 1 virtualization system 110 and the type 2 virtualization system 120. In the type 2 virtualization system 120, a control VM corresponds to a host OS 101, which corresponds to the control VM 101 in the type 1 virtualization system 110.

In various examples described herein, the control VM 101 or the host OS 101 may be referred to as a host VM.

Figure 2:
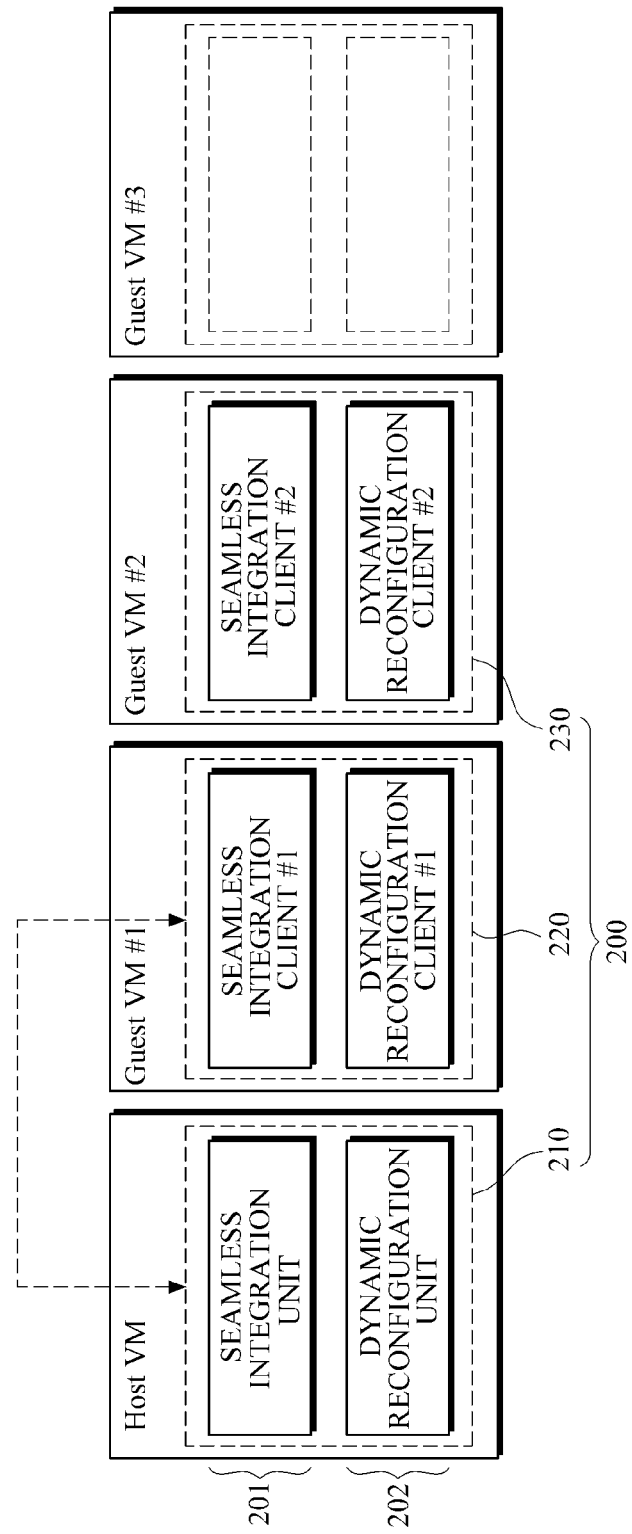
FIG. 2 is a diagram illustrating an example of a seamless application integration (SAI) apparatus.

FIG. 2 illustrates an example of a seamless application integration (SAI) apparatus.

Referring to the example illustrated in FIG. 2, the SAI apparatus 200 includes an SAI server 210 and SAI clients 220 and 230. For example, the SAI server 210 may run in a host VM, and the SAI clients 220 and 230 may run in a guest VM.

In this example, the SAI server 210 and the SAI clients 220 and 230 include a seamless integration unit 201 and a dynamic reconfiguration unit 202. The seamless integration unit 201 may provide a seamless application integration environment in a virtualization system, and the dynamic reconfiguration unit 202 may dynamically reconfigure the seamless integration unit. For example, the dynamic reconfiguration unit 202 may dynamically install, replace, or change the seamless integration unit 201 or components of the seamless integration unit 201. For convenience of explanation, the seamless integration unit 201 of the SAI server 210 is referred to as a seamless integration server, and the seamless integration unit 201 of the SAI clients 220 and 230 are referred to as seamless integration clients. In similar manner, the dynamic reconfiguration unit 202 of the SAI server 210 is referred to as a dynamic reconfiguration server, and the dynamic reconfiguration unit 202 of the SAI clients 220 and 230 are referred to as dynamic reconfiguration clients.

The seamless integration unit 201 may provide a seamless application integration environment to a user in the virtualization system. For example, the seamless integration server is of the SAI server 210 may communicate with a seamless integration client #1 of the SAI client #1 220 to provide an interface that enables the user to interact with applications of a guest VM #1 in the same manner as the user interacts with applications of the host VM.

The dynamic reconfiguration unit 202 may dynamically reconfigure the seamless integration unit 201. In this example, the dynamic reconfiguration unit 202 may dynamically install, replace, or change the seamless integration server of the SAI server 210 or one or more components (or elements) that are included in the seamless integration client of each of the SAI clients 220 and 230 during runtime of the guest VM.

For example, the dynamic reconfiguration unit 202 may install an SAI client in a guest VM #3 if the SAI client is not installed in the guest VM #3.

As another example, the dynamic reconfiguration unit 202 may replace the SAI client #2 230 according to a version of the SAI server 210 installed in the host VM if a version of the SAI client #2 230 does not match a version of the SAI server 210.

As another example, the dynamic reconfiguration unit 202 may change one or more components that are included in the SAI client #1 220 to components that support the runtime environment of the host VM, if the SAI client #1 installed in the guest VM #1 does not support the runtime environment of the host VM. In addition, the dynamic reconfiguration unit 202 may change some or all components that are included in the SAI server 210 to components that support the runtime environment of the guest VM #1, if the SAI server 210 installed in the host VM does not support the runtime environment of the guest VM #1.

FIGS. 3A to 3D illustrate examples of a display of a virtualization system.

Figure 3A:
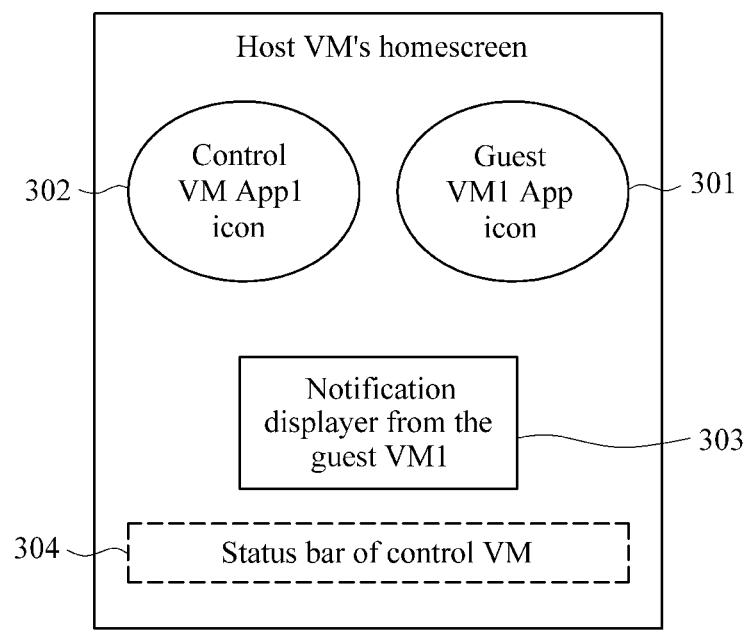
FIGS. 3A to 3D are diagrams illustrating examples of a display of a virtualization system.

In the example illustrated in FIG. 3A, an icon 301 for an application of a guest VM may be displayed on a display of a host VM in the same fashion as an icon 302 for an application of the host VM is displayed. A notification displayer 303 may display event information of an is event that occurs in the guest VM. For example, the notification displayer 303 may be in the form of a widget of the host VM. Status information of the guest VM may be displayed in the form of the notification displayer 303. As another example, status information may be displayed on a tray of status bar 304 that is provided by the display of the host VM.

Figure 3B:
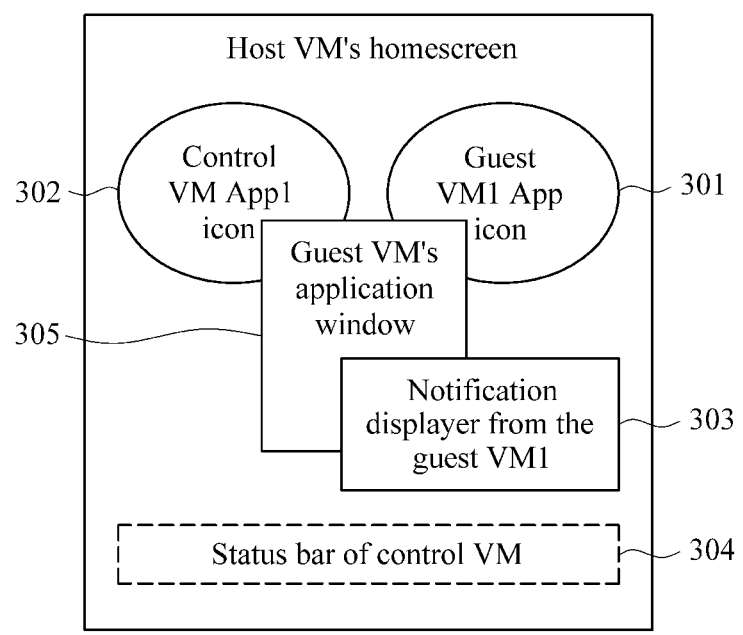

In response to a user selecting icon 301 for the application of the guest VM, an application execution window for the application of the guest VM may be displayed as shown in the example illustrated in FIG. 3B.

Referring to FIG. 3B, a guest VM application execution window 305 may be displayed in the same manner as a host VM application execution window. In this example, the guest VM application may be recognized by the user as an application that originally runs based on the host VM.

For example, the virtualization system may provide a foreground domain switching mode. Foreground domain may refer to a domain that exclusively uses a human input device (HID) and a display device. In this example, the virtualization system may determine that the host VM or the guest VM as a foreground domain, and may designate a display of the determined VM as a main display.

Figure 3C:
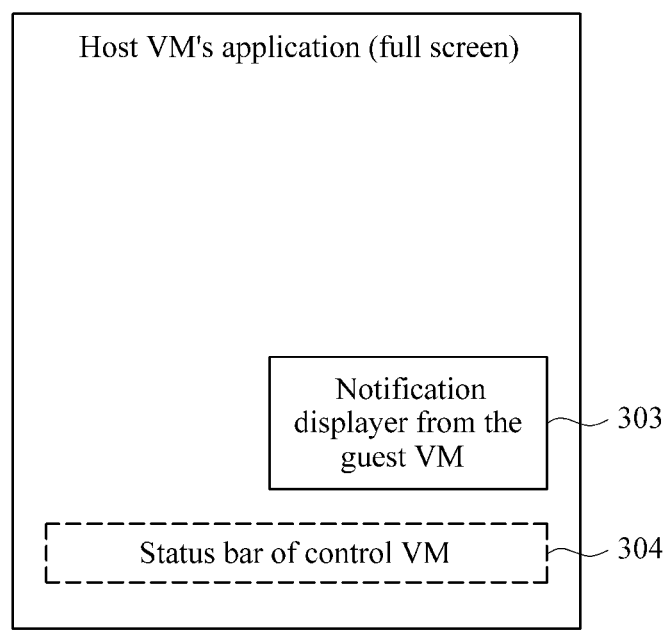

Referring to FIG. 3C, in the case in which the host VM is designated as a foreground domain, the host VM application execution window may be displayed in full screen. The notification displayer 303 and the status bar 304 that provide the event information of the guest VM may be displayed on a part of the host VM application execution window which is displayed in full screen.

Figure 3D:
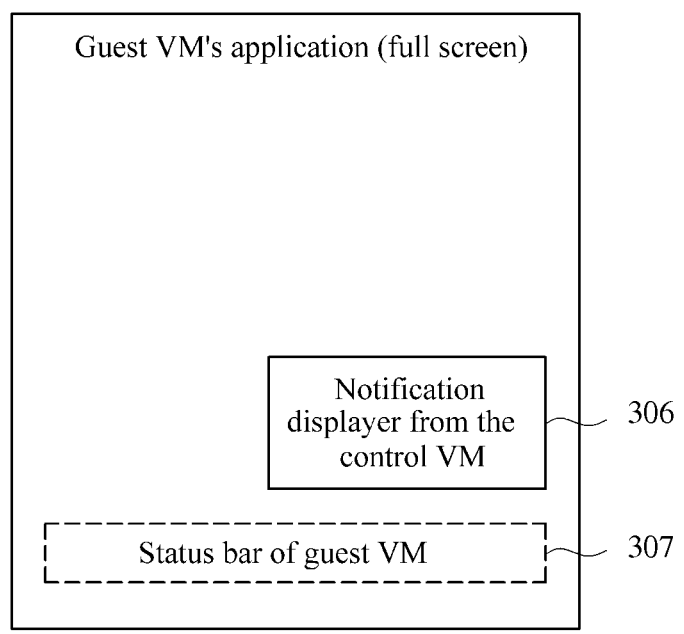

Referring to FIG. 3D, in the case in which the guest VM is designated as a foreground domain, the guest VM application execution window may be displayed in full screen. In this example, the notification displayer 306 may provide event information on an event that occurs in the host VM. Additionally, in a case in which the guest VM provides the status bar 307, the event information of the host VM may be displayed in the form of a tray on the status bar 307.

Figure 4:
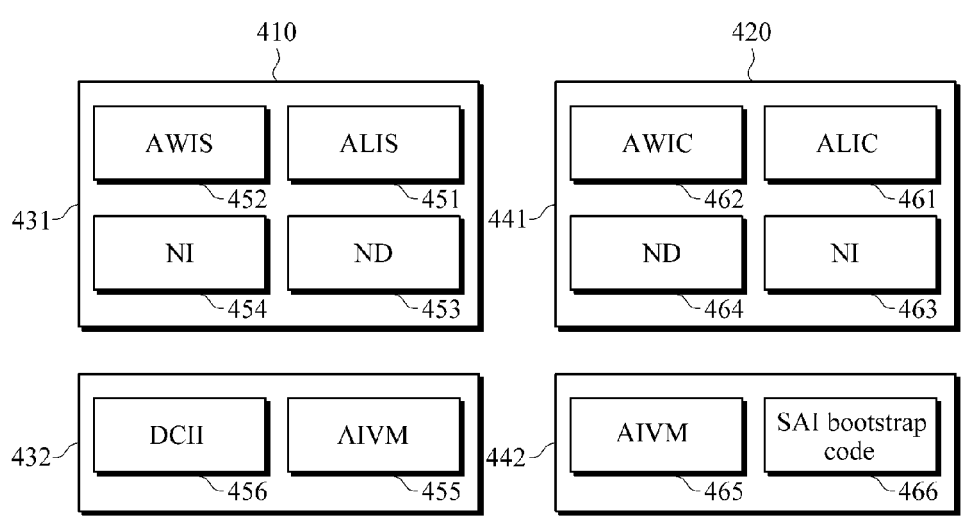
FIG. 4 is a diagram illustrating another example of the seamless application integration (SAI) apparatus.

FIG. 4 illustrates another example of the seamless application integration (SAI) apparatus.

Referring to the example illustrated in FIG. 4, the SAI apparatus includes an SAI server 410 and an SAI client 420. In this example, the SAI server 410 includes a seamless integration server 431 and a dynamic reconfiguration server 432. The seamless integration server 431 includes an application launch integration server (ALIS) 451, an application window integration server (AWIS) 452, a notification displayer (ND) 453, and notification integration (NI) 454.

The SAI client 420 includes a seamless integration client 441 and a dynamic reconfiguration client 442. In this example, the seamless integration client 441 includes an application launch integration client (ALIC) 461, an application window integration client (AWIC) 462, notification integration (NI) 463, and notification displayer (ND) 464.

The ALIS 451 may generate an interface that is the same as an interface that is used to run an application of the host VM. Information used to generate the interface may be provided from the ALIC 461 of the SAI client 420. The interface may be an execution icon or information window as shown in the examples illustrated in FIGS. 3A to 3D. For example, the ALIS 451 may change an icon image received from the ALIC 461 of the SAI client 420 based on the runtime environment of the host VM while generating an icon as an interface for executing a guest VM application.

In response to receiving a request to execute an application of a guest VM on a host VM, the ALIS 451 may transmit the application execution request to the ALIC 461 of the corresponding guest VM. The ALIS 451 may terminate a relay program that is involved with is an application of the guest VM, in response to the execution of the application being terminated.

The AWIS 452 may control the display of an execution window while the application of the guest VM is running. For example, the AWIS 452 may display an execution window of an application of a guest VM in a display area of a host VM in a virtualization system in which a foreground domain switching mode is not supported.

As another example, the AWIS 452 may request the virtual machine monitor 102 (see FIGS. 1A and 1B) to switch a foreground domain and display an execution window of an application of a guest VM in full size on a display area of the guest VM in a virtualization system in which a foreground domain switching mode is supported. The ND 453 may communicate with the NI 464 of the SAI client 420 to output information that is generated in the guest VM to a display of the host VM. The ND 453 may be present in each of the guest VMs. As another example, a single ND 453 may manage a plurality of guest VMs.

The NI 454 may forward an event that occurs in the host VM to the ND 464 of the SAI client 420.

The dynamic reconfiguration server 432 includes an application integration version manager (AIVM) 455 and dynamic code insertion invocation (DCII) 456. For example, the AIVM 455 may exchange a version check message with the AIVM 465 of the SAI client 420 to match versions of the SAI server 410 and the SAI client 420. The DCII 456 may install the SAI client 420 in the guest VM if the SAI client 420 has not been installed in the guest VM.

For example, if a migrated VM is working as a guest VM, and the guest VM does not have the SAI client 420 installed therein, the DCII 456 may install the SAI client 420 into the migrated VM to support a seamless application integration environment. As another example, the DCII 456 may remove the installed SAI client 420 if the migrated VM is terminated.

Each component of the SAI server 410 may be dynamically reconfigured during runtime is to support the seamless application integration environment of the guest VM. For example, each component of the SAI server 410 may be reconfigured through plug-and-play as a component that can support the SAI client 420. In this example, the components that can support the SAI client 420 may be provided from local storage or from an external source through a network. Installation and removal of the SAI client 420 may be performed in a system at a physically remote location by use of VM migration scheme.

The ALIC 461 may determine an application in the guest VM to access the host VM, and may provide the ALIS 451 of the SAI server 410 with information. For example, the information may include an icon image for configuring an interface, identifier of the application, execution path, and the like.

The ALIC 461 may execute an application based on a request from the ALIS 451 of the SAI server 410, and provide termination information to ALIS 451 of the SAI server 410 if the application is terminated.

The AWIC 462 may forward a user input that is transmitted from the host VM to the guest VM, and may forward graphical or sound output that results from the execution of the application to the host VM.

The NI 463 and the ND 464 are the same as the NI 454 and the ND 453 of the SAI server 410, respectively.

In this example, the dynamic reconfiguration client 442 includes an application integration version manager (AIVM) 465 and an SAI bootstrap code 466. The AIVM 465 may exchange a version check message with the AIVM 455 of the SAI server 410 to match versions of the SAI server 410 and the SAI client 420. The SAI bootstrap code 466 may be inserted by the DCII 456 of the SAI server 410, for example, if the SAI client 420 has not been installed in the guest VM, and may function to install and execute the SAI client 420 in the guest VM.

Similar to the components of the SAI server 410, each component of the SAI client 420 may be dynamically reconfigured during runtime to support a seamless application integration environment.

Figure 5:
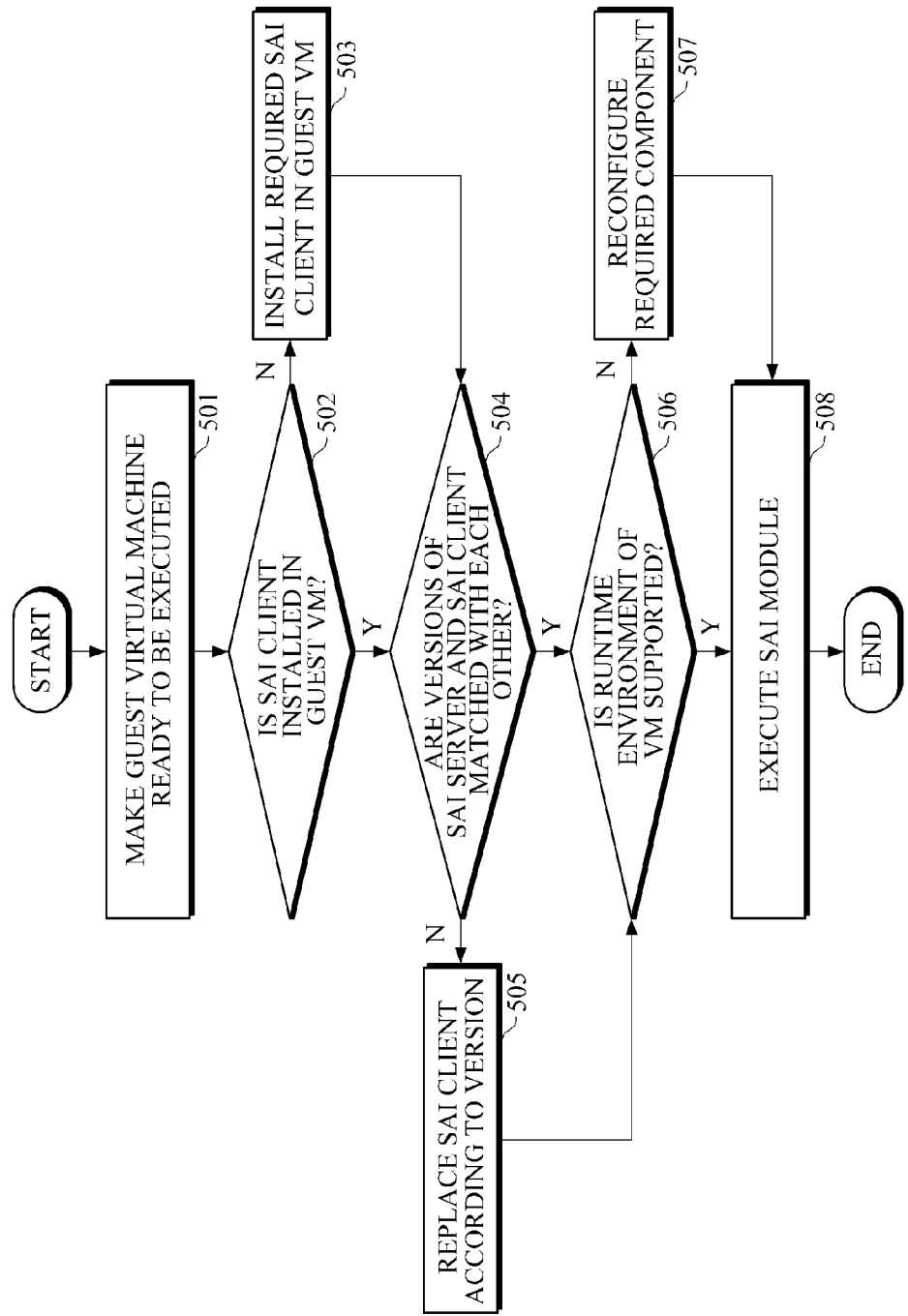
FIG. 5 is a flowchart illustrating an example of a seamless application integration method.

FIG. 5 illustrates an example of a seamless application integration method.

Referring to the example illustrated in FIG. 5, in response to execution of a guest VM being ready to proceed, in 501, an SAI server determines whether the guest VM has an SAI client installed therein, in 502. For example, as illustrated in FIG. 2, if the guest VM #3 is ready to be executed, the SAI server 210 may detect whether the SAI client has been installed in the guest VM #3. In response to the SAI client not being installed in the guest VM #3, an appropriate SAI client is installed in the guest VM #3, in 503. Examples of a method of determining to install the SAI client in the guest VM #3 and a method of installation of the SAI client are shown in FIGS. 6 and 7.

Figure 6:
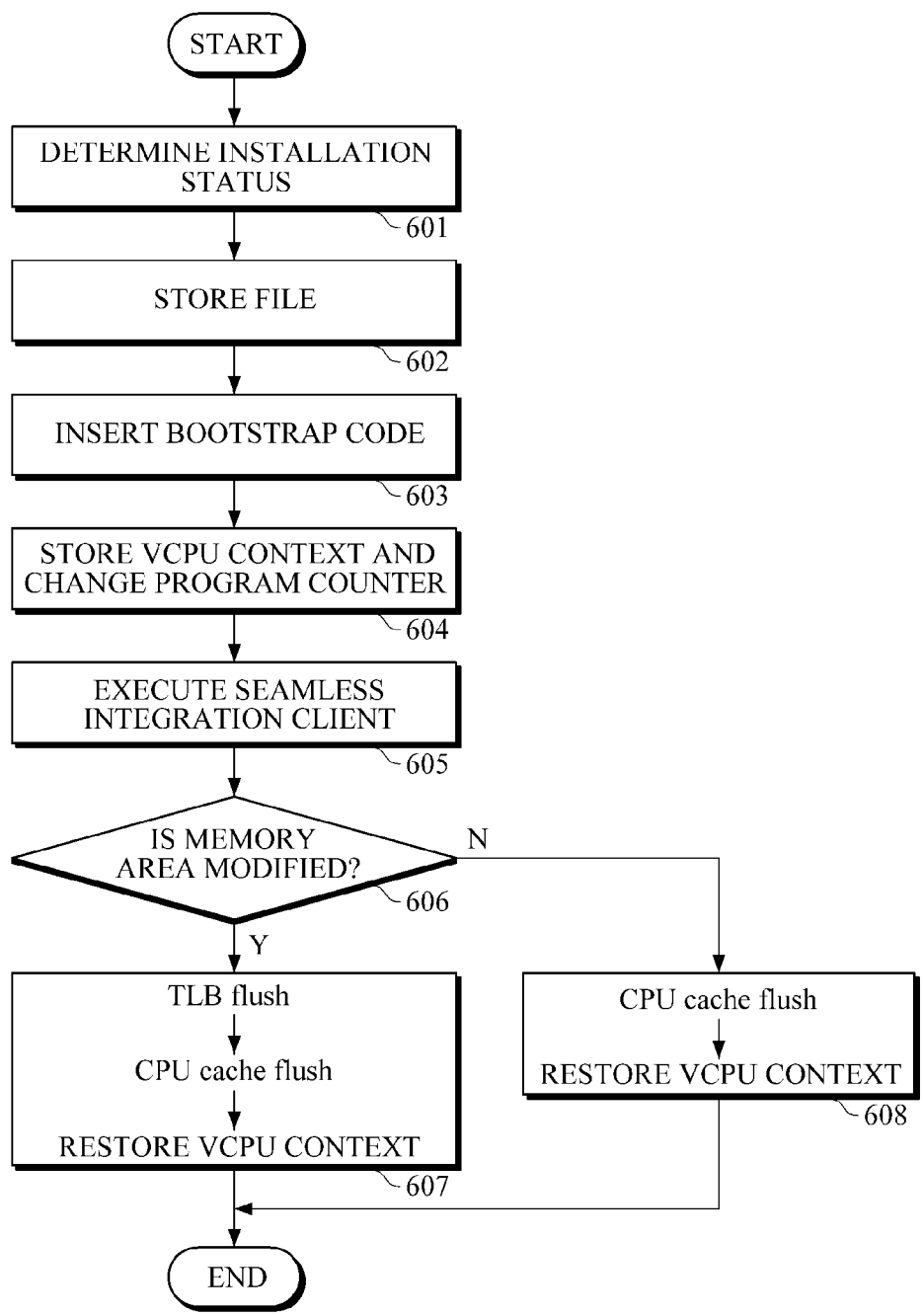
FIG. 6 is a flowchart illustrating an example of a method of installing an SAI client.
Figure 7:
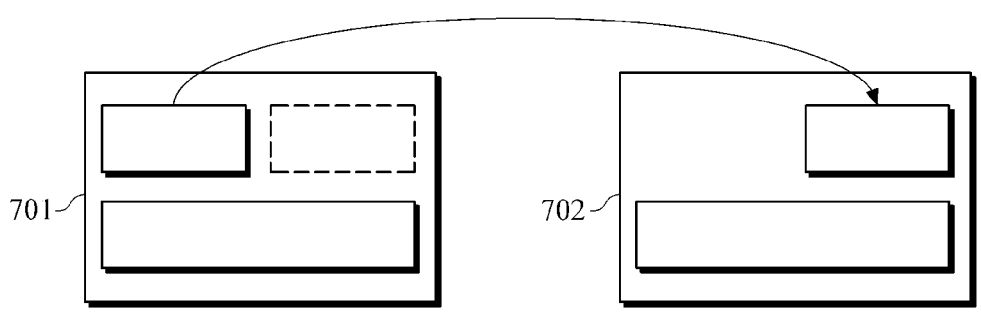
FIG. 7 is a diagram illustrating an example of installing an SAI client.

FIG. 6 illustrates an example of a method of installing an SAI client.

Referring to the example illustrated in FIG. 6, an SAI server determines whether the SAI client is installed in the guest VM #3, in 601. For example, in the case of a migrated VM, because the VM was not originally running on a current system, but has been migrated from another system, the current SAI client may not have been installed in the VM.

Referring to FIGS. 2 and 6, the SAI server 210 may examine a process list or a file system of the guest VM #3 to detect whether the SAI client has been installed. For example, the dynamic reconfiguration server of the SAI server 210 may access a memory area of the guest VM #3 through the virtual machine monitor 102 (referring to FIG. 1A). For example, the dynamic reconfiguration server may examine an SAI identifier using a VM introspection scheme, and may detect whether the SAI client has been installed based on the examination result.

The dynamic reconfiguration server of the SAI server 210 may detect whether an SAI is client instance is present in process list information that is retained in a kernel of the guest VM #3. If it is estimated that the SAI client instance is not present in the process list, the dynamic reconfiguration server may additionally search the file system of the guest VM to detect whether the SAI client has been installed.

If it is determined that the SAI client is not installed in the guest VM #3, the SAI server 210 accesses the guest VM #3 and stores an SAI client installation file, in 602.

In 603, the SAI server 210 accesses the memory area of the guest VM #3 through the virtual machine monitor 102 and inserts a bootstrap code into the memory area to drive the SAI client.

In this example, the SAI server 210 stops a currently running guest VM through the virtual machine monitor 102, stores VCPU context of current registers of the guest VM, and changes a location of a program counter to a location at which the bootstrap code is inserted, in 604.

In response to the change of the indication location of the program counter, in 605 the SAI client is installed and executed according to the bootstrap code.

Upon completion of SAI client bootstrapping, in 606 the SAI server 210 restores the stored VCPU context of the guest VM to allow the guest VM to proceed with an operation that was being performed before the insertion of the bootstrap code. The SAI server 210 may determine whether coherency is maintained between the memory area of the guest VM, a CPU cache, and a translation lookaside buffer (TLB) even after the insertion of SAI client program code.

In a case in which the memory area is modified, in 607 a flush is performed on a TLB and a CPU cache for the modified memory area to achieve memory coherency. If the memory is area is not modified, CPU cache flush is performed and the VCPU context is restored to return the location of the program counter to an original location, in 608.

FIG. 7 illustrates an example of installing an SAI client.

Referring to the example illustrated in FIG. 7, the SAI client may be installed in a local machine 701 or a remote machine 702. For example, the local machine 701 may be a computing system that is installed in a host VM, and the remote machine 702 may be a computing system that is physically separated from the local machine 701.

An SAI server of the local machine 701 may install the SAI client used by the guest VM in the remote machine 702 and may prepare the SAI client to be ready to run, and then receive the guest VM in which the SAI client is installed from the remote machine 702 and execute the guest VM. In this example, the SAI server of the local machine 701 may transmit runtime environment information of the guest VM that is currently running on the local machine 701 to the remote machine 702. The remote machine 702 which has received the runtime environment information may install the SAI client in the guest VM as shown in the example illustrated in FIG. 6.

In the same manner, if the SAI client is to be removed at the termination of the guest VM, the local machine 701 may transmit the runtime environment information of the guest VM to the remote machine 702, and the remote machine 702 may execute code cleanup.

For example, the local machine 701 may be a mobile terminal, and the remote machine 702 may be a personal computer that is connected with the mobile terminal so as to communicate therewith.

For example, if a guest VM which does not have an SAI client installed therein is present in the mobile terminal, the SAI client may be installed in the personal computer using VM migration, and the guest VM in which the SAI client has been installed may be transmitted to the is mobile terminal.

Referring to the example illustrated in FIG. 5 again, if the SAI client is installed, a determination is made as to whether a version of the SAI server matches a version of the SAI client, in 504.

If the versions do not match with each other between the SAI server and the SAI client, the SAI client is replaced to match the versions between the SAI client and the SAI server, in 505. For example, referring again to FIG. 2, in a case in which a version of the seamless integration server of the SAI server 210 is not matched with a version of the seamless integration client #2 of the SAI client #2 230, the dynamic reconfiguration server of the SAI server 210 may communicate with the dynamic reconfiguration client #2 of the SAI client #2 230 in order to replace the seamless integration client #2 of the SAI client #2 230.

Figure 8:
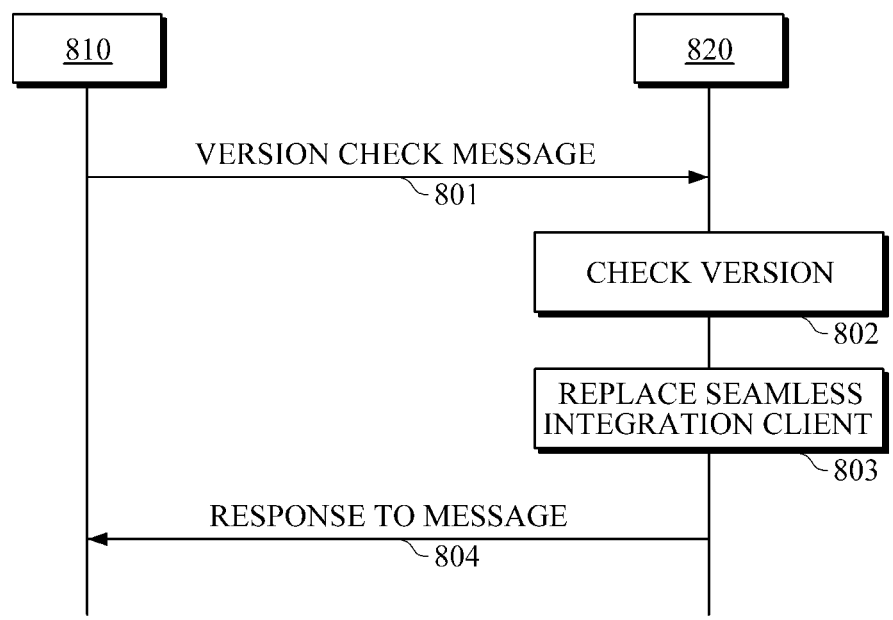
FIG. 8 is a diagram illustrating an example of a process of checking and replacing versions of an SAI server and an SAI client.

FIG. 8 illustrates an example of a method of checking and replacing versions of an SAI server and an SAI client.

In the example illustrated in FIG. 8, in 801 a dynamic reconfiguration server 810 transmits a version check message to a dynamic reconfiguration client 820.

In response to receiving the version check message, in 802 the dynamic reconfiguration client 820 determines whether a version of a seamless integration client of a guest VM matches a version of a seamless integration server of a host VM.

If the versions do not match, in 803 the dynamic reconfiguration client 820 replaces the current seamless integration client of the guest VM with a seamless integration client of a version that matches the version of the seamless integration server of the host VM.

The dynamic reconfiguration client 820 that has replaced the seamless integration client according to the version transmits a response message to the dynamic reconfiguration server 810 is of the host VM, in 804.

Referring again to the example illustrated FIG. 5, if it is determined through operations 504 and 505 that the versions of the SAI server and the SAI client match, the SAI server determines whether the SAI server supports a runtime environment of the guest VM or whether the SAI client supports a runtime environment of the host VM, in 506.

For example, as shown in FIG. 2, a determination may be made as to whether the SAI server 210 installed in the host VM and the SAI client #1 220 installed in the guest VM #1 match to the extent that each can support the runtime environment of the other. If the SAI server 210 does not support the runtime environment of the guest VM #1 or the SAI client #1 220 does not support the runtime environment of the host VM, components used by the SAI server 210 and/or the SAI client #1 220 are replaced and/or added, in 507. In 508, the SAI apparatus is executed.

For example, the ND 464 component which is dependent on the runtime environment of the host VM may be replaced with one that is suitable to the runtime environment of the host VM.

As described herein, if a guest VM is executed that does not have an SAI module installed therein, because the SAI module is installed during runtime, a seamless application integration environment can be provided with respect to various guest VMs.

Further, because components may be dynamically configured even when the SAI module or the runtime environment is modified, a more flexible, seamless application integration environment can be established.

The processes, functions, methods, and/or software described herein may be recorded, stored, or fixed in one or more computer-readable storage media that includes program instructions to be implemented by a computer to cause a processor to execute or perform the is program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically is connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A seamless application integration apparatus comprising:
   a processor configured to execute a host virtual machine and at least one guest virtual machine;
   a seamless integration server installed in the host virtual machine and configured to provide a seamless application integration (SAI) environment in a virtualization system that comprises the host virtual machine and the at least one guest virtual machine;
   a dynamic reconfigurer configured to:
   determine, in response to the at least one guest virtual machine being ready to execute on the host virtual machine, whether a seamless integration client installed in the at least one guest virtual machine corresponds to the seamless integration server, and
   in response to determining that the seamless integration client installed in the at least one guest virtual machine does not correspond to the seamless integration server, install a seamless integration client that corresponds to the seamless integration server in the at least one guest virtual machine during runtime of the at least one guest virtual machine;
   a dynamic reconfiguration server configured to determine, in response to the at least one guest virtual machine being ready to execute on the host virtual machine, whether each component of the seamless integration server supports a runtime environment of the at least one guest virtual machine and replace or add a component in the seamless integration server based on the determination result; and
   a dynamic reconfiguration client configured to determine whether each component of the seamless integration client supports a runtime environment of the host virtual machine and replace or add a component in the seamless integration client based on the determination result during runtime of the at least one guest virtual machine,
   wherein the seamless integration server is configured to communicate with the corresponding seamless integration client to provide an interface enabling a user to interact with applications of the at least one guest virtual machine via the host virtual machine.

2. The seamless application integration apparatus of claim 1, wherein the dynamic reconfigurer is further configured to examine a process list or a file system of the at least one guest virtual machine to detect whether the seamless integration client has been installed.

3. The seamless application integration apparatus of claim 1, wherein the dynamic reconfigurer is further configured to
   access a file system of the at least one guest virtual machine to store an installation file of the seamless integration client;
   access a memory area of the at least one guest virtual machine to insert a bootstrap code to run the seamless integration client; and
   change a location of a program counter of the at least one guest virtual machine to a location at which the bootstrap code is inserted.

4. The seamless application integration apparatus of claim 1, wherein the dynamic reconfigurer is further configured to:
   determine whether a memory area of the at least one guest virtual machine is modified as a result of execution of the installed seamless integration client;
   in response to the memory area of the at least one guest virtual machine being modified, performing a flush on a translation lookaside buffer for the modified memory area; and
   in response to the memory area of the at least one guest virtual machine not being modified, flushing a CPU cache and restoring VCPU context to return the program counter to an original location.

5. The seamless application integration apparatus of claim 1, wherein the dynamic reconfigurer is further configured to be located in a remote system which is physically separated from the virtualization system and to perform installation of the seamless integration client.

6. A seamless application integration apparatus comprising:
a processor configured to execute a host virtual machine and at least one guest virtual machine;
a seamless integration server installed in the host virtual machine and configured to provide a seamless application integration (SAI) environment in a virtualization system that comprises the host virtual machine and the at least one guest virtual machine;
a seamless integration client that corresponds to the seamless integration server and is configured to be installed in the at least one guest virtual machine, wherein the seamless integration server is configured to communicate with the seamless integration client to provide an interface enabling a user to interact with applications of the at least one guest virtual machine via the host virtual machine; and
a dynamic reconfigurer configured to determine whether a version of the seamless integration server matches a version of the seamless integration client, and, in response to determining that the version of the seamless integration sever does not match the version of the seamless integration client, to replace the seamless integration client during runtime of the at least one guest virtual machine, wherein the dynamic reconfigurer comprises:
a dynamic reconfiguration server configured to transmit a version check message, and
a dynamic reconfiguration client configured to receive the version check message, determine whether the version of the seamless integration client matches the version of the seamless integration server based on the received version check message, replace the seamless integration client based on the determination result to match the versions between the seamless integration server and the seamless integration client, and generate a response to the version check message.

7. A seamless application integration apparatus comprising:
a processor configured to execute a host virtual machine and at least one guest virtual machine;
a seamless integration server installed in the host virtual machine and configured to provide a seamless application integration (SAI) environment in a virtualization system that comprises the host virtual machine and the at least one guest virtual machine;
a seamless integration client that corresponds to the seamless integration server and configured to be installed in the at least one guest virtual machine in response to a determination that the seamless integration client that corresponds to the seamless integration server is not installed in the at least one guest virtual machine,
wherein the seamless integration server is configured to communicate with the seamless integration client to provide an interface enabling a user to interact with applications of the at least one guest virtual machine via the host virtual machine;
a dynamic reconfiguration server configured to determine, in response to the at least one guest virtual machine being ready to execute on the host virtual machine, whether each component of the seamless integration server supports a runtime environment of the at least one guest virtual machine and replace or add a component in the seamless integration server based on the determination result; and a dynamic reconfiguration client configured to determine whether each component of the seamless integration client supports a runtime environment of the host virtual machine and replace or add a component in the seamless integration client based on the determination result during runtime of the at least one guest virtual machine.

8. A seamless application integration method comprising:
determining, in response to a guest virtual machine being ready to execute on a host virtual machine, whether a seamless integration client is installed in the guest virtual machine;
determining whether the seamless integration client corresponds to a seamless integration server,
wherein the seamless integration server is installed in the host virtual machine that provides a seamless application integration (SAI) environment in a virtualization system that comprises the host virtual machine and the guest virtual machine, and
wherein the seamless integration server is configured to communicate with the seamless integration client to provide an interface enabling a user to interact with applications of the guest virtual machine via the host virtual machine;
installing, in response to determining that the seamless integration client that corresponds to the seamless integration server is not installed in the guest virtual machine, the seamless integration client in the guest virtual machine during runtime of the guest virtual machine;
determining, in response to the guest virtual machine being ready to execute on the host virtual machine, whether each component of the seamless integration server supports a runtime environment of the guest virtual machine and replace or add a component in the seamless integration server based on the determination result; and
determining whether each component of the seamless integration client supports a runtime environment of the host virtual machine and replace or add a component in the seamless integration client based on the determination result during runtime of the guest virtual machine.

9. The seamless application integration method of claim 8, further comprising:
determining whether a version of the seamless integration server matches a version of the seamless integration client; and
replacing the seamless integration client based on the determination result.

10. The seamless application integration method of claim 9, further comprising:
determining whether the seamless integration server supports a runtime environment of the guest virtual machine or whether the seamless integration client supports a runtime environment of the host virtual machine; and
replacing or adding the seamless integration server or the seamless integration client based on the determination result.

11. A seamless application integration (SAI) method of a control virtual machine (VM) that includes an SAI server that is executed on a device, the SAI method comprising:
determining, in response to a guest VM being ready to execute on the device, whether an SAI client installed in the guest VM corresponds to the SAI server;

determining whether the seamless integration client corresponds to a seamless integration server;
installing, in response to determining that the SAI client installed in the guest VM does not correspond to the SAI server, the SAI client that corresponds to the SAI server in the guest VM during runtime of the guest VM;
executing the guest VM;
determining, in response to the guest VM being ready to execute on a host VM, whether each component of the SAI server supports a runtime environment of the guest VM and replace or add a component in the SAI server based on the determination result; and
determining whether each component of the SAI client supports a runtime environment of the host VM and replace or add a component in the SAI client based on the determination result during runtime of the guest VM,
wherein the SAI server is configured to communicate with the SAI client to provide an interface enabling a user to interact with applications of the guest virtual machine via the control virtual machine.

12. The SAI method of claim 11, wherein, in response to the SAI client corresponding to the SAI server being installed in the guest VM, the method further comprises determining whether the version of the SAI client corresponds to the current version of the SAI server.

13. The SAI method of claim 12, wherein, in response to the current version of the SAI client not being installed in the guest VM, the method further comprises updating the SAI client with the current SAI client corresponding to the current SAI server.

14. The SAI method of claim 11, wherein, in response to the SAI client corresponding to the SAI server being installed in the guest VM, the method further comprises determining whether the SAI server of the control VM and the SAI client of the guest VM match such that each supports a runtime environment of the other.

15. The SAI method of claim 14, wherein, in response to the SAI client not supporting the runtime environment of the current SAI server, the method further comprises replacing the SAI client of the guest VM with an SAI client that supports the runtime environment of the current SAI server.

* * * * *